Oct. 8, 1929.                C. C. ABBOTT                1,731,120
                             HEATING UNIT
                          Filed Oct. 30, 1925

Inventor:
Charles C. Abbott,
by
His Attorney.

Patented Oct. 8, 1929

1,731,120

UNITED STATES PATENT OFFICE

CHARLES C. ABBOTT, OF PITTSFIELD, MASSACHUSETTS, ASSIGNOR TO GENERAL ELECTRIC COMPANY, A CORPORATION OF NEW YORK

HEATING UNIT

Application filed October 30, 1925. Serial No. 65,865.

My invention relates to electric heating units, and has for its object the provision of a simple, rugged and reliable device of this character.

Although my invention obviously has application to various types of heating units, it has particular application to electric heating units of the so-called cartridge type which are arranged to be inserted in apertures provided for them in the body to be heated. Considerable difficulty is sometimes experienced in removing these units for repairs or replacement by reason of the fact that the expansion due to heating has a tendency to cause the unit to stick in the aperture. In one of its aspects my invention has for its object the provision of a cartridge heating unit in which the expansion is compensated for in the interior of the unit so that there is no tendency for the unit to stick.

In carrying out my invention in one form I place an electric heating element between specially constructed metallic members which are clamped tightly on the heating element by means of an outer metallic sheath.

Figure 1:
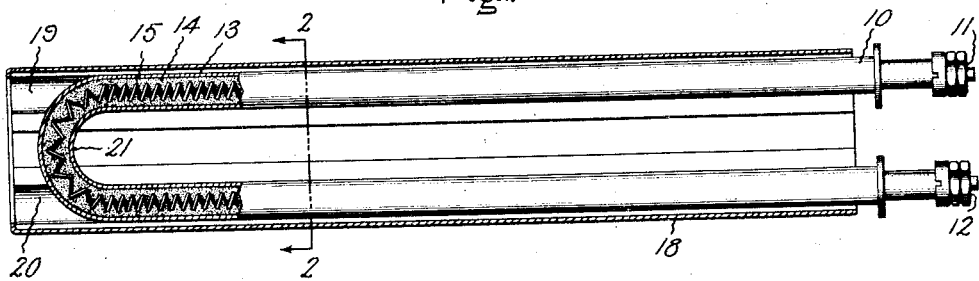
Figure 2:
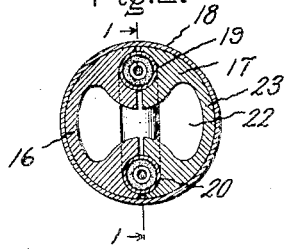

For a more complete understanding of my invention reference should be had to the accompanying drawing in which Fig. 1 is a view mainly in section, taken along the line 1—1 of Fig. 2 looking in the direction of the arrows, of an electric heating unit embodying my invention; while Fig. 2 is a sectional view taken along the line 2—2 of Fig. 1 looking in the direction of the arrows.

Referring to the drawing, in one embodiment of my invention I provide a sheathed heating resistance element 10 which may be and preferably is bent or otherwise shaped in the form of a hairpin so that the two electric terminals 11 and 12 at the ends of the element are adjacent each other. As shown, this sheathed heating element is of the form described and claimed in my Patent No. 1,367,341 dated February 1, 1921, it comprising an outer metallic cylindrical sheath 13 in which a helical resistance conductor 14 is embedded in powdered electrically insulating material 15. Preferably the powdered insulating material is compacted, for instance, by reducing the diameter of the sheath by swaging. In carrying out my present invention, however, any suitable heating element may be used.

The hairpin shaped heating element is placed between two metallic clamping members 16 and 17 and the clamping members are secured tightly against the heating element by means of an outer metallic casing 18 which is shrunk on the clamping members, for example, by swaging. Each clamping member is provided with longitudinal grooves 19 and 20 adjacent its sides in which the parallel lengths of the heating element fit. The heating element is thus substantially surrounded by the metal of the clamping members so that heat is conducted rapidly away from it. As shown, the depth of the grooves in the clamping members is not quite as great as one half the diameter of the heating element so that the adjacent surfaces of the clamping members are spaced slightly apart. This assures that the clamping members are seated on the heating element. At one end of each clamping member the inner side walls of the grooves 19 and 20 are cut away to provide a cross groove for the bend 21. The two clamping members are similar in construction and are substantially semicircular in cross section so that they can conveniently be enclosed in a cylindrical sheath.

For the purpose of compensating for expansion, each clamping member is provided with a longitudinal recess 22 extending between the grooves 19 and 20. This recess is relatively deep whereby a thin wall portion 23 is provided, this wall portion being of sufficient thickness to conduct heat efficiently to the adjoining surfaces of the heating unit. A zone of thick metal remains on each side adjacent the lengths of the heating element. It will be observed that expansion of the unit due to changes in temperature will be taken care of largely by the yielding of the relatively thin wall portions 23 and consequently no appreciable enlargement of the heating unit results. This prevents sticking of the heating unit. The arrangement, furthermore, provides a very simple and rugged device.

It will be observed that the recesses 22 in the clamping members have the effect of uncovering a short section of the heating element at the bend 21 where the heating element passes from one groove to the other. Since this section is not in engagement with any metallic parts which would conduct away its heat, it would operate at a much higher temperature than the remainder of the unit if heat were generated at the same rate in this section. In order to prevent overheating in this section, the turns of the resistance conductor 14 are spaced apart a greater distance at the bend than in the straight portions, as shown in the drawing, so that the rate of heat generation is reduced and the heating element does not operate at a materially higher temperature at this point.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is,—

1. A heating unit comprising an elongated insulated resistance conductor, a plurality of elongated clamping members in lengthwise engagement with said resistance conductor; and a metallic sheath surrounding said clamping members so as to secure said clamping members on said resistance conductor.

2. A heating unit comprising a sheathed resistance element, a plurality of elongated metallic clamping members in lengthwise engagement with said element, said clamping members each being provided with a recess to receive said element, and a metallic sheath shrunk tightly on said members so as to clamp said members on said resistance element.

3. A heating unit comprising an elongated insulated resistance conductor, a plurality of elongated clamping members in lengthwise engagement with said resistance conductor, and a metallic sheath surrounding said clamping members so as to secure said clamping members on said resistance conductor, said clamping members being recessed longitudinally to compensate for expansion due to changes in temperature.

4. A heating unit comprising an insulated resistance conductor, clamping members between which said resistance conductor is placed, a sheath surrounding said clamping members so as to secure said members on said resistance conductors, said clamping members being provided with longitudinal recesses whereby said clamping members are adapted to yield to compensate for expansion due to changes in temperature.

5. A heating unit comprising a sheathed resistance element, metallic members between which said element is placed and a metallic sheath fitting tightly around the outside of said members so as to clamp said members on said resistance element, said members being arranged to compensate for expansion of said unit due to changes in temperature.

6. A heating unit comprising an elongated sheathed resistance element having its sheath shaped in the form of a hairpin, metallic clamping members between which said element is placed, and a second sheath surrounding and compacting on said members so as to secure them in good heat conducting relation with said heating element.

7. A heating unit comprising a sheathed resistance element shaped in the form of a hairpin, metallic clamping members between which said element is placed, and a sheath enclosing said members compacted tightly on said members so as to secure them in good heat conducting relation with said heating element, said clamping members being provided with longitudinal recesses whereby said clamping members are adapted to yield to compensate for expansion due to changes in temperature.

8. A heating unit comprising an inner tubular sheath shaped in the form of a hairpin, a helical resistance conductor embedded in compacted insulating material in said sheath, metallic clamping members of substantially semi-circular cross section between which said sheath is clamped, and an outer tubular metallic sheath shrunk tightly on said clamping members so as to secure them in good heat conducting relation with said inner sheath, said clamping members being provided with internal longitudinal recesses.

9. A hollow tubular cartridge heating unit comprising a hairpin shaped insulated resistance unit, a pair of clamping members having substantially semicircular cross sections provided with grooves to receive said heating unit between them, and a tubular sheath shrunk tightly on said members so as to clamp said heating unit in good heat conducting relation therewith, said clamping members being provided with registering longitudinal recesses.

In witness whereof, I have hereunto set my hand this 26th day of October, 1925.

CHARLES C. ABBOTT.